US008944470B2

(12) United States Patent
Mayrhofer et al.

(10) Patent No.: US 8,944,470 B2
(45) Date of Patent: Feb. 3, 2015

(54) SAFETY LABEL OR ADHESIVE TAPE WITH EVIDENCE OF TAMPERING

(75) Inventors: Marco Mayrhofer, Sierning (AT); Georg Aigner, Pabneukirchen (AT)

(73) Assignee: Hueck Folien Ges.m.b.H., Baumgartenberg (AT)

( * ) Notice: Subject to any disclaimer, the term of this patent is extended or adjusted under 35 U.S.C. 154(b) by 21 days.

(21) Appl. No.: 13/812,648

(22) PCT Filed: Jul. 30, 2011

(86) PCT No.: PCT/EP2011/003833
§ 371 (c)(1),
(2), (4) Date: Mar. 12, 2013

(87) PCT Pub. No.: WO2012/019721
PCT Pub. Date: Feb. 16, 2012

(65) Prior Publication Data
US 2013/0161938 A1 Jun. 27, 2013

(30) Foreign Application Priority Data

Aug. 13, 2010 (AT) .............................. A 1355/2010

(51) Int. Cl.
*B32B 3/10* (2006.01)
*G09F 3/00* (2006.01)
(Continued)

(52) U.S. Cl.
CPC .............. *G09F 3/0292* (2013.01); *B42D 15/00* (2013.01); *C09J 7/0296* (2013.01); *G09F 3/10* (2013.01);
(Continued)

(58) Field of Classification Search
CPC ........................................................ B32B 3/10

USPC .......... 283/81, 100, 101; 428/195.1, 201–203
See application file for complete search history.

(56) References Cited

U.S. PATENT DOCUMENTS 4,746,556 A * 5/1988 Matsuguchi et al. ............ 283/81
5,510,171 A * 4/1996 Faykish ........................ 428/201
(Continued)

FOREIGN PATENT DOCUMENTS

| EP | 1 972 674 | 9/2008 |
| EP | 2 130 884 | 12/2009 |
| WO | 01/93231 | 12/2001 |

OTHER PUBLICATIONS

International Search Report issued Dec. 15, 2011 in International (PCT) Application No. PCT/EP2011/003833.

*Primary Examiner* — Kyle Grabowski
(74) *Attorney, Agent, or Firm* — Wenderoth, Lind & Ponack, L.L.P.

(57) ABSTRACT

A tamper-evident adhesive security tape or label includes a flexible backing substrate with a surface that bears an embossed varnish layer, a semitransparent metal layer and/or a high refractive index layer, a partial release varnish layer, one or more varnish layers having optical properties, a full-area release varnish layer, a full-area varnish layer, and a self-adhesive coating layer. In regions not coated with the partial release varnish layer, an adhesion of the embossed varnish layer, the semitransparent metal layer and/or the HRI layer, the one or more varnish layers having optical properties, the full-area release varnish layer, the full-area varnish layer, the self-adhesive coating layer, and an article to be secured to one another is greater than an adhesion of the one or more varnish layers having optical properties to the full-area release varnish layer or an adhesion of the full-area release varnish layer to the full-area varnish layer.

20 Claims, 4 Drawing Sheets

(51) Int. Cl.
*B42D 15/00* (2006.01)
*C09J 7/02* (2006.01)
*G09F 3/10* (2006.01)
*G09F 3/03* (2006.01)
*G09F 3/02* (2006.01)

(52) U.S. Cl.
CPC ......... *G09F 3/0341* (2013.01); *C09J 2203/338* (2013.01); *C09J 2400/163* (2013.01); *G09F 2003/0239* (2013.01); *G09F 2003/0241* (2013.01); *G09F 2003/0255* (2013.01); *G09F 2003/0277* (2013.01)

USPC .......... 283/81; 283/100; 283/101; 428/195.1; 428/200; 428/201; 428/202; 428/203

(56) References Cited

U.S. PATENT DOCUMENTS

| | | | |
|---|---|---|---|
| 5,770,283 A * | 6/1998 | Gosselin et al. | 283/81 |
| 6,284,337 B1 * | 9/2001 | Lorimor et al. | 283/81 |
| 7,268,926 B2 * | 9/2007 | Ishimoto et al. | 428/40.1 |
| 2002/0191234 A1 | 12/2002 | Ishimoto et al. | |
| 2004/0020086 A1 | 2/2004 | Hudson | |
| 2006/0193021 A1 | 8/2006 | Ishimoto et al. | |
| 2008/0078492 A1 * | 4/2008 | D'Amato | 283/94 |

* cited by examiner

SAFETY LABEL OR ADHESIVE TAPE WITH EVIDENCE OF TAMPERING

BACKGROUND OF THE INVENTION

1. Field of the Invention

The invention relates to a tamper-evident adhesive security tape or label which has an optically active security feature and an optical feature.

An optically active feature for the present purposes comprehends diffractive structures, diffraction gratings, surface reliefs, holograms, kinegrams, and the like.

2. Description of the Related Art

Adhesive security tapes or labels in the sense of the present invention fulfill two functions: on the one hand, the adhesive tape or label is intended to ensure the authenticity of a product or the integrity of a pack through the provision of an optically active security feature. Preference for this purpose is given to the use of holograms, which are well established in the product protection segment and therefore offer a high degree of acceptance, recognizability, and security. On the other hand, however, an attempt at tampering, in other words an unauthorized attempt to detach the adhesive tape or label, is to be clearly recognizable. The latter measure ensures that the user can be reasonably certain that a product protected with an adhesive tape or label of this kind is genuine and in its original packaging.

Typical holograms which are already being used today in product protection and as security features for documents of value customarily have a basic metallically lustrous appearance which gives rise, on a change in the viewing angle, to a play of rainbow colors as a result of diffraction of light at the structures of the hologram. These diffractive effects, however, are always very similar, and the metallic luster is common to all such products. Consequently there is a demand for new optically variable effects which differ from the conventional effect not only in the pattern of the hologram but also in the basic color and/or by virtue of a different luster.

Known from KR 10079525 is a hologram film and a method for its production. The construction there consists of a backing substrate, a release layer, an embossed layer (hologram layer), a partial metal layer, a masking layer, a print layer, and an adhesive layer. The print layer and the adhesive layer there have different fluorescent features. Evidence of tampering is not possible with this construction.

Known additionally, from decorative applications and packaging applications, are what are called dry peel labels. The feature of such labels is that the label consists of two parts which can be easily separated from one another. After the label has been adhered to an object, these two parts are initially still connected. When the upper part of the label, which often has a grip tab or the like, is then removed, the bottom part of the label remains, together with the self-adhesive coating, on the object. On the side facing away from the object, however, the self-adhesive coating is covered by a sheet or a varnish layer, and so the part that remains on the object no longer feels tacky ("dry"). Furthermore, as a result of this specific design, it is virtually impossible to adhere again the part of the label that has been removed, since the removed part as well is no longer tacky.

Combinations of such dry peel labels with a tamper-evident feature are also known, from EP-A 1 113 059, for example. The adhesive tape or label described therein, however, does not have any optically active security features.

BRIEF SUMMARY OF THE INVENTION

It was an object of the invention, therefore, to provide an adhesive security tape or label which features not only an optically active security element but also optically recognizable evidence of tampering and which differs in its overall optical impression from conventional, metallically lustrous optically active structures, where after the evidence of tampering has been detached, neither the removed part nor the part of the label or adhesive remaining on the object that is to be secured are tacky.

The invention accordingly provides a tamper-evident adhesive security tape or label comprising a flexible backing substrate based on a flexible polymeric film, characterized in that one surface of the backing substrate bears the following applied layers:
a) an embossed layer,
b) a semitransparent metal layer or a high refractive index layer,
c) a first, partial release varnish layer in the form of letters, signs, symbols, lines, guilloches, numbers or writing,
d) one or more varnish layers having optical properties,
e) a second, full-area release varnish layer,
f) a further full-area varnish layer,
g) a self-adhesive coating,
where, in the regions not coated with the release varnish layer c),
the adhesion of all layers to one another and the adhesion of the layer g) to the object to be secured are greater than the adhesion of the layer d) to the layer e) or of the layer e) to the layer f)
and where,
in the regions coated with the release varnish layer c), the adhesion of all layers to one another and the adhesion of the layer g) to the object to be secured are greater than the adhesion of the layer b) to the layer c) or of the layer c) to the layer d),
and where in particular
the adhesion of the layer b) to the layer c) or of the layer c) to the layer d) is lower than the adhesion both of the layer d) to the layer e) and of the layer e) to the layer f).

Examples of suitable backing substrates are backing films, preferably flexible polymeric films, comprising, for example, PI, PP, MOPP, PE, PPS, PEEK, PEK, PEI, PSU, PAEK, LCP, PEN, PBT, PET, PA, PC, COC, POM, ABS, PVC, fluoropolymers, such as commercial Teflon, and the like. The backing films preferably have a thickness of 5-700 μm, more preferably 5-200 μm, very preferably 5-100 μm.

In the first step, a varnish layer a) is applied to one surface of the backing substrate, and is embossed in the same operation or in a subsequent process. The adhesion of the varnish layer a) to the backing substrate must be sufficient for the integrated layer system not to part along this interface when the label is detached from a liner or when the adhesive tape is unwound or when the tamper evidence feature is triggered.

If the adhesion of the varnish layer a) to the backing substrate is not great enough without further measures, then it is possible for an adhesion promoter layer, which improves the adhesion of the varnish layer a) to the backing substrate, to have been applied to the backing substrate prior to varnishing with the layer a). Alternatively a backing substrate appropriately pretreated by chemical or physical means can be used.

It may, however, be entirely desirable for the integrated layer system to separate at the interface between layer a) and the backing substrate, if, for example, the label is executed as what is called a transfer label. In this embodiment of the invention, the adhesion between layer a) and the backing substrate is lower than the adhesion of the layers a) to g) to one another. Following application of the label to an article by means of the adhesive layer, the backing substrate can be removed without triggering an evidence of tampering. This evidence of tampering then comes about, for example, as a result of the so-called tape test, in which an adhesive tape or another label is adhered to the layer system remaining on the article, and removed again. In that case the tamper evidence feature is triggered and a part of the layers according to claim 1 is removed again.

In order to lower the adhesion, the backing substrate may be provided, for example, with a release layer. Where the embossed varnish layer a) already has poor adhesion to the backing substrate, without further measures, there is no need for a release layer for application as a transfer label.

Suitable release layers include, in particular, known poorly adhering varnish compositions, based for example on methacrylate. Furthermore, it is also possible to use very thinly applied oil layers or polyamide, polyethylene, silicone or fluoropolymer wax layers as release layers. Subsequently, as described above, the varnish layer a) is applied.

On the surface remote from the backing substrate, the varnish layer a) has a surface structure, as for example a surface relief, a hologram, a diffractive structure or a diffraction grating. This structure can be produced by means of known hot-stamping or UV embossing methods, by impression from structures present on an embossing die. When a hot-stamping method is used, the varnish layer a) is a thermoplastic varnish layer; when a UV embossing method is employed, the varnish layer a) is radiation-curing. Stamping and embossing methods of these kinds are well known to the skilled person, and are disclosed in EP-A 1 310 381, the content of which is hereby incorporated in full into the present specification.

The thickness of the applied varnish layer a) may vary depending on the end product requirement and thickness of the substrate, and in general is between 0.5 and 50 µm, preferably between 2 and 10 µm, more preferably between 2 and 5 µm.

The varnish layer a) is applied, over the full area or partially, by a coating process, such as spraying, pouring, curtain coating, slot-die coating, dipping or knife coating, for example, or by a printing process, as for example gravure, flexographic, offset, screen or digital printing.

Subsequently, a semitransparent metallic layer or a high refractive index layer b) is applied to the varnish layer a).

The semitransparent metallic layer b) has an optical density of around 0.1 to 1.3, preferably of 0.1 to 0.8. An optical density of this kind ensures that the layer is still sufficiently transparent for the layers situated behind it to be still visible to the viewer.

Examples of suitable semitransparent metallic layers include layers comprising a metal or an alloy. Suitability as metal layer is possessed by layers comprising Al, Cu, Fe, Ag, Au, Cr, Ni, Zn, Sn, Pt, Ti, Pd, and the like. Examples of suitable alloys are Cu—Al alloys, Cu—Zn alloys, and the like.

The metallic layer is applied preferably by a PVD or CVD process (sputtering, vapor deposition, gas-phase deposition).

Alternatively the layer b) may be executed as an HRI (high refractive index) layer. This HRI layer may preferably consist of a varnish layer with a high refractive index, or of a layer comprising metal compounds. Examples of suitable metal compounds are oxides or sulfides of metals, more particularly $TiO_2$, Cr oxides, ZnS, Cu oxides, indium tin oxide, antimony tin oxide, antimony zinc oxide, FTO, ZnO, $Al_2O_3$, or silicon oxides.

Varnish layers with a high refractive index are applied preferably by known printing or coating processes (see above); HRI layers comprising metal compounds are applied preferably by a PVD or CVD process (sputtering, vapor deposition).

Subsequently a release varnish layer c) is applied partially, in the form, for example, of letters, signs, symbols, lines, guilloches, numbers or writing.

Suitable release varnish comprises preferably known, poorly adhering varnish compositions, based for example on cycloolefin copolymers, nitrocellulose, acrylates, polyvinyl chloride, ethylene-acrylate copolymers or styrene-acrylates in a suitable solvent. To adjust the adhesion it is preferred in this case to add chlorinated polyolefins. The fraction of the chlorinated polyolefins in the composition may be 0 to 130 wt. % in relation to the base polymer.

An alternative possibility is to use any desired varnish systems, their adhesion reduced by an additive, as for example a polyacrylate copolymer (available, for example, under the brand name BYK-394® from BYK-Chemie GmbH).

It is also possible, furthermore, to use very thinly applied polyamide, polyethylene, or fluoropolymer wax layers, or silicone coatings.

The release varnish layer may optionally be provided with security pigments such as fluorescent pigments and the like.

The adhesion of the release varnish layer c) is set so that when the tamper evidence feature is triggered, the release varnish coating c) parts either from the layer b) or the layer d), but the rest of the film construction remains intact in its structure at these locations. In any case, the adhesion of the release varnish layer c) to the layer b) is lower than the adhesion of the semitransparent or HRI layer b) to the stamping/embossing varnish layer a).

The release varnish layer c) is applied partially by means of a printing process, such as by gravure, flexographic, offset, screen, or digital printing, for example.

Applied partially or over the full area to this release varnish layer are one or more varnish layers d) having optical properties.

The optical properties of the layer d), more particularly the color, can be brought about by means of dyes and/or pigments. Pigments which can be used include all known pigments, examples being inorganic-based pigments, such as titanium dioxide, zinc sulfide, kaolin, indium tin oxide, antimony tin oxide, fluorine tin oxide, aluminum, chromium oxides and silicon oxides, or organic-based pigments, such as phthalocyanine blue, isoindolidine yellow, dioxazine violet, and the like, and also colored and/or encapsulated pigments in chemically, physically or reactively drying binder systems. Suitable dyes include, for example, 1,1- or 1,2-chromium-cobalt complexes.

Additionally it is possible for effect and/or security dyes and/or pigments to be employed, examples being luminescent dyes and pigments, which fluoresce or phosphoresce in the visible, UV or IR range; effect pigments such as liquid crystals, mother-of-pearl, bronzes and/or multilayer color-change pigments and thermochromic inks and pigments. They can be used individually or in all possible combinations. Also conceivable are combinations of visible with invisible color pigments and effect pigments and/or security pigments.

This layer or these layers d) may also, however, have a defined color gradation, or else may be executed in multicolor printing with partial or full overlap above or alongside one another and in partial or full-area form.

The colored layer or layers d) are applied by any desired process, but preferably by a printing process.

The thickness of the color layers d) is a function of the desired hiding power of the color, in conjunction with the printing process used.

In order to achieve the effect that is the object, namely for neither the removed part nor the part still remaining to the article that is to be secured to feel tacky, a further release varnish layer e) is applied to the full area. The possible compositions of the release varnish layer are identical to the possible compositions of the release varnish layer c).

It should be ensured, however, that the composition of the release varnish layer e) is selected such that the adhesion to the layer situated directly above and below is better than the adhesion of the release varnish layer c) to the layers situated directly above and below. For example, on selection of a release varnish based on cycloolefin copolymer, the adhesion can be controlled very precisely by varying the fraction of chlorinated polyolefins added. In the specific case this means that the fraction of chlorinated polyolefins in the layer e) must be higher than in the layer c).

Located between the second release varnish layer e) and the self-adhesive coating g) there is a further varnish layer f). The composition of the layer f) is arbitrary, but the layer must have sufficient inherent stability and, in the regions coated with release varnish c), must exhibit sufficient adhesion to the layers e) and g), so that the layer assembly, when the tamper evidence feature is triggered, does not part at one of the interfaces of the layer f) with the adjacent layers e) or g), but parts instead at one of the interfaces of the layer c) with its adjacent layers b) or d). The primary purpose of the varnish layer f) is to cover fully the self-adhesive coating, thereby preventing the remnant and the removed part from feeling tacky after the tamper evidence feature has been triggered. This results in a thickness for the layer f) of approximately 3-50 μm.

Subsequently a self-adhesive coating g) is applied. With the aid of the self-adhesive coating g), the adhesive security tape or label is adhered to the article or pack that is to be secured.

As a result of the different partial adhesion relationships in the label, the varnish layer d) suffers destructive tearing on any attempt to remove the adhesive tape or label from the article to be secured. One part of the varnish layer d) remains on the article to be secured; the second part of the varnish layer d) is removed with the backing substrate from the article. The two parts have a complementary behavior relative to one another—that is, either positive structures are visible on the removed backing substrate and negative structures on the article, or vice-versa.

The following boundary conditions must be observed in every case in order to ensure a reliable operation:

In the regions not coated with the release varnish layer c), the adhesion of all layers to one another and the adhesion of the layer g) to the object to be secured must be greater than the adhesion of the layer d) to the layer e) or of the layer e) to the layer f). In the regions coated with the release varnish layer c), the adhesion of all layers to one another and the adhesion of the layer g) to the object to be secured must be greater than the adhesion of the layer b) to the layer c) or of the layer c) to the layer d). Finally, the adhesion of the layer b) to the layer c) or of the layer c) to the layer d) must be less than the adhesion both of the layer d) to the layer e) and of the layer e) to the layer f), since otherwise, when the tamper evidence feature is triggered in the regions coated with the release varnish layer c), the varnish layer d) does not suffer destructive tearing, but rather the release occurs over the full area along one of the interfaces of the varnish layer e) to the adjacent layers.

In view of the particular circumstances when the tamper evidence feature is triggered, these circumstances being unable to be foreseen by the label manufacturer, it is possible for different combinations of the above boundary conditions to occur in a single label. The design of the label, however, is initially selected such that in the two relevant regions (with and without release varnish c)), one of the two above cases preferentially occurs.

Optionally, the surface of the backing substrate situated opposite to the construction may additionally bear an applied print primer, which enables or facilitates subsequent printing of a label or adhesive tape.

This printing may consist, for example, of customer-specific or product-specific individual data, or else of any desired patterns, signs, symbols, and the like.

In the case of use as an adhesive tape, the second surface of the backing substrate may optionally bear an applied release varnish layer, in order to allow the tape to be wound up; in this case, the adhesion of the self-adhesive coating g) to this second release varnish layer is once again poorer than the adhesion within the integrated system formed by the layers a) to g).

BRIEF DESCRIPTION OF THE DRAWINGS

Embodiments in accordance with the invention are shown in FIGS. 1 to 5.

In these FIGS.

Figure 1:
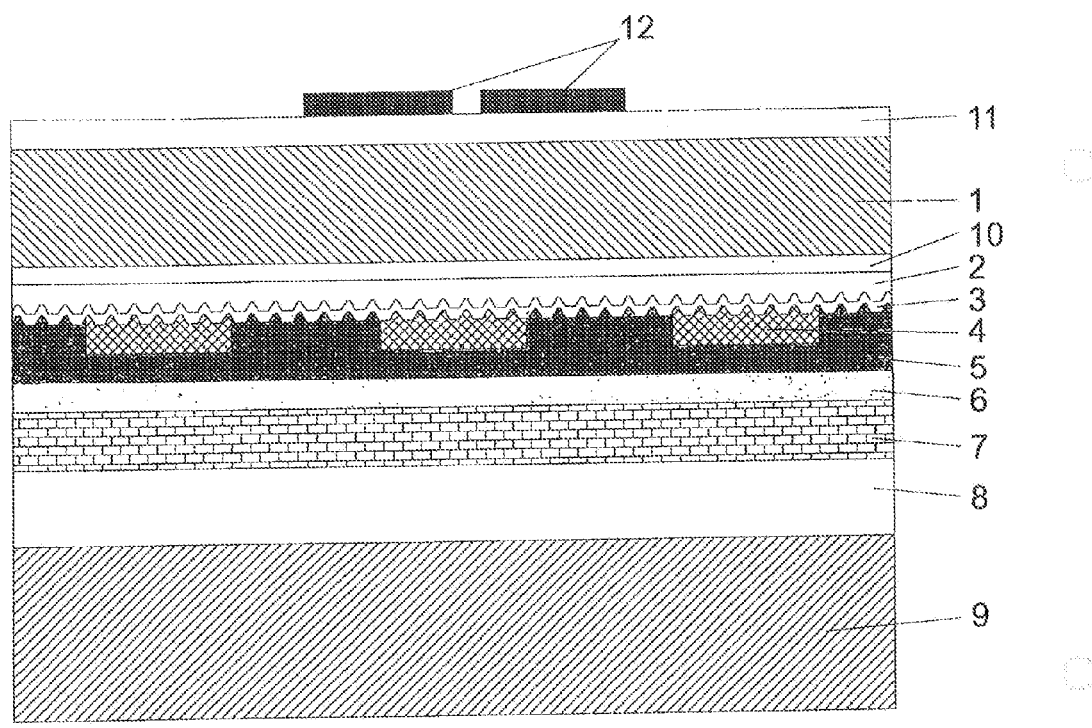

1 denotes the backing substrate
2 denotes a varnish layer having an optically active structure (a hologram, for example)
3 denotes a semitransparent metal layer or an HRI layer
4 denotes the partial release varnish layer
5 denotes the layer having optical properties
6 denotes the second, full-area release varnish layer
7 denotes a full-area varnish layer
8 denotes a self-adhesive coating
9 denotes the article bearing the applied adhesive tape or label
10 denotes an (optional) adhesion promoter layer
11 denotes an (optional) print primer layer
12 denotes customer-specific printing
13 denotes the part of the label that is removed with the backing substrate 1
14 denotes the part of the label which remains on the article 9 to be secured
15, 16, 17, 18 denote regions having different adhesion conditions
19 denotes the security label of the invention
20 denotes the part of the layer having optical properties 5 that remains on the article 9 to be secured and exhibits negative recesses in the form of signs
21 denotes the part of the layer having optical properties 5 in the form of positive signs which is removed with the backing substrate 1

FIG. 1 shows, in cross section, the construction of a label in the adhered state.

Figure 2:
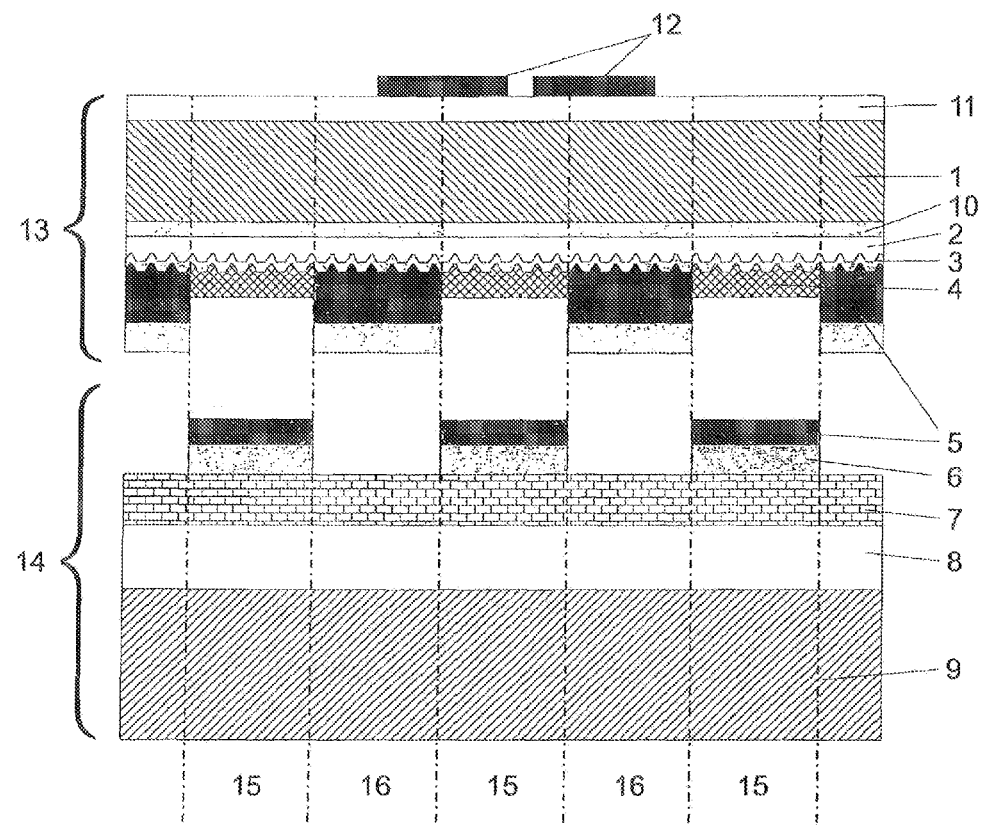
Figure 3:
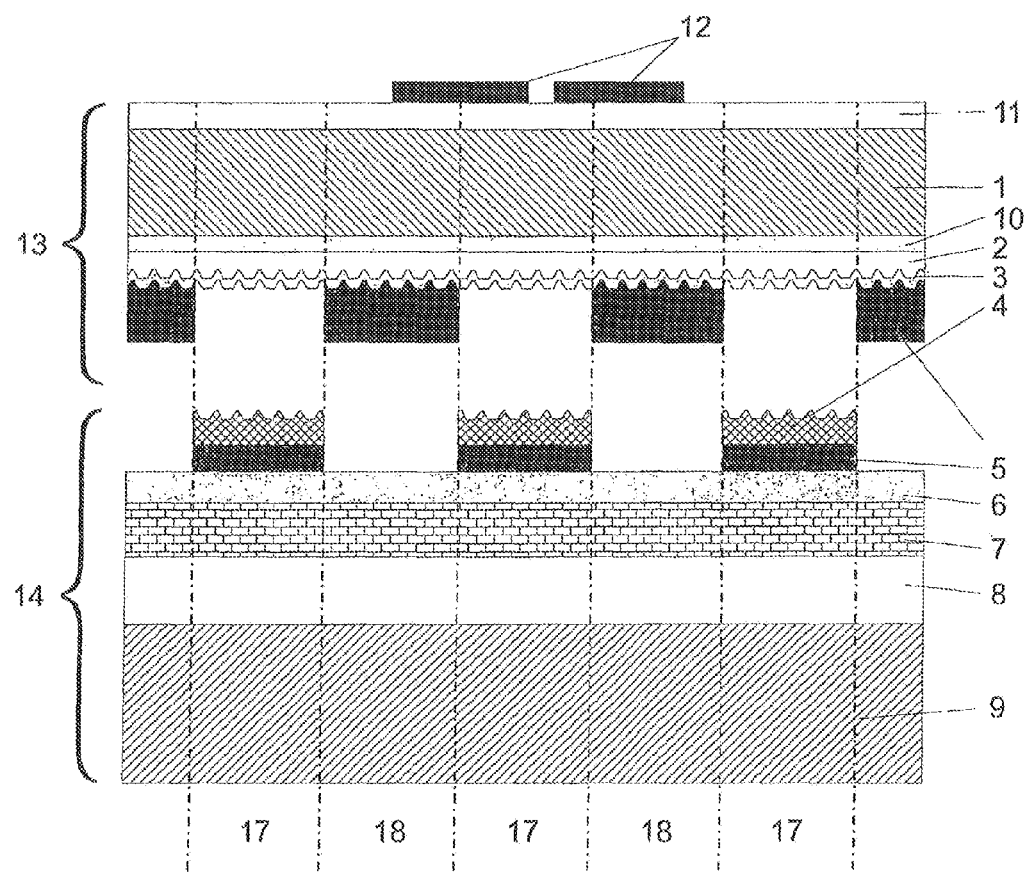

FIGS. 2 and 3 show, likewise in cross section, the state after triggering of the tamper evidence feature, with different triggering mechanisms of the invention.

Figure 4:
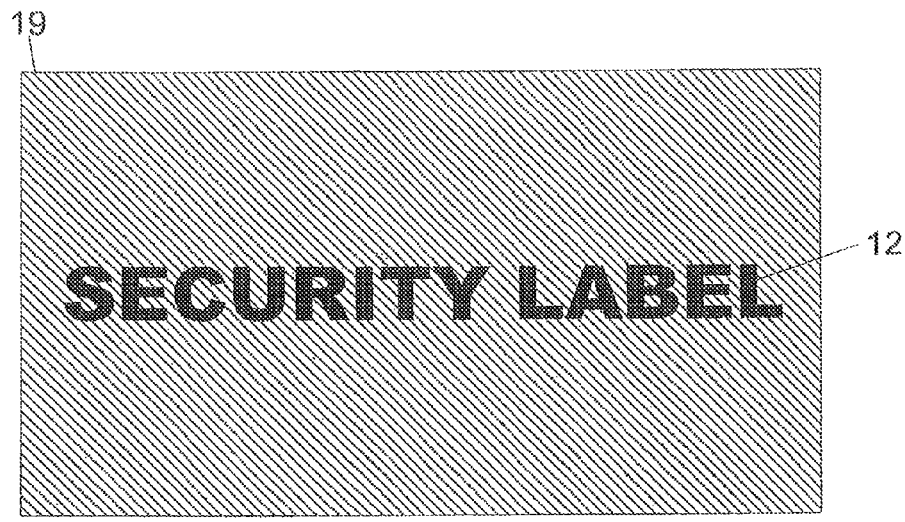
Figure 5:
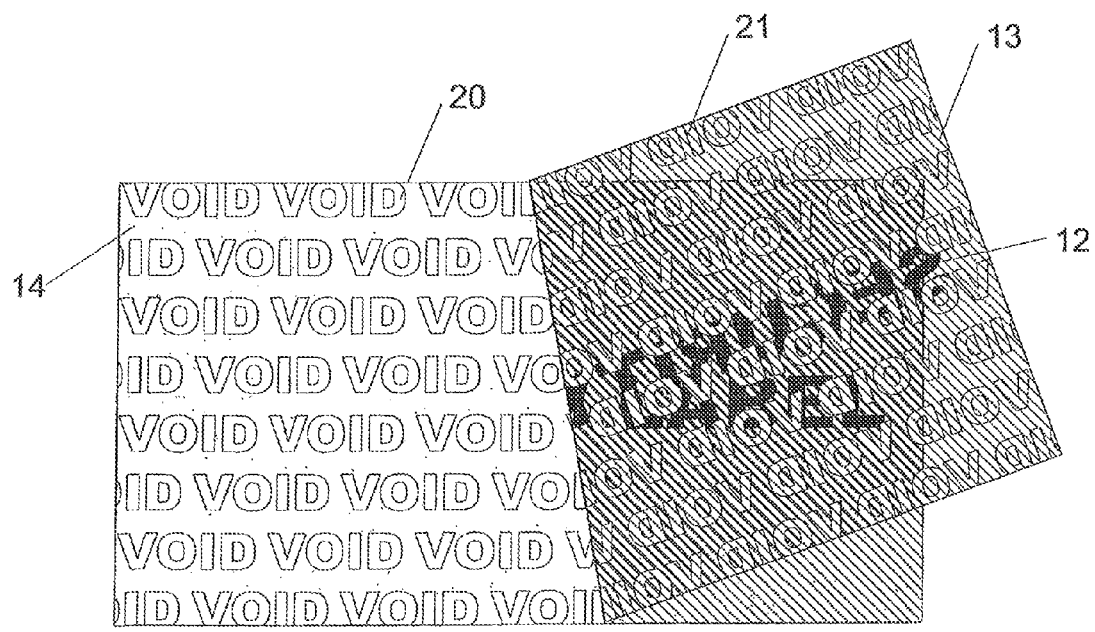

FIG. 4 shows a plan view of a security label of the invention;

FIG. 5 shows the same security label with partially triggered tamper evidence feature.

DETAILED DESCRIPTION OF THE INVENTION

In FIG. 1, a label of the invention has been adhered to an article 9. The label consists of a backing substrate 1, which is coated on one surface with a primer 11 and is subsequently printed with a visible motif 12. Located on the opposite surface is first an adhesion promoter layer 10, an embossed varnish layer 2, and a semitransparent metallic layer or a high refractive index layer 3.

Applied subsequently, to the layer 3, is a partial release varnish layer 4 which is covered by a full-area layer having optical properties 5. There subsequently follow the second release varnish layer 7 and the self-adhesive coating 8, by which the label is fastened to the article 9 to be secured.

FIG. 1 shows an example where the user views the optically active structure through the backing substrate 1; for this purpose, the backing substrate 1 is usefully implemented transparently. Through the semitransparent metal layer or HRI layer 3, the light is partially reflected at the interface with the layer 2, and the diffractive effect of the optically active structure becomes visible to the viewer. As a result of the partial translucency of the layer for visible light, however, the underlying layer having optical properties 5, as well, is still visible. Accordingly, the optically active structure and the color layer are superimposed on one another in an advantageous way. The ultimate impression given to the viewer is that of a hologram with a colored background, but not one having no metallic luster, of the kind otherwise characteristic for conventional embossed and metalized holograms.

In FIGS. 2 and 3, the tamper evidence feature has been triggered by removal of the label. It can clearly be seen that parts of the layer having optical properties 5 remain on the article 9 to be secured, and do so exactly in those regions in which the release varnish layer 4 has been applied. In the regions without release varnish layer 4, the layer having optical properties 5 remains on the removed backing substrate 1 and on the hologram applied to it. This "destructive tearing" of the layer 5 gives the viewer optical evidence of tampering, in the form of letters, signs, symbols, lines, guilloches, numbers, or writing. FIGS. 2 and 3 differ from one another in the precise configuration of the adhesion relationships between the individual layers. The regions 15 to 17 make clear these inventive adhesion relationships between the individual layers, which lead to the revelation of the optical effect when the tamper evidence feature is triggered.

In the region 15, the integrated system parts between the release varnish layer 4 and the layer having optical properties 5—in other words, the adhesion between the layers 4 and 5 is lower than the adhesion of all other layers to one another and than the adhesion of the self-adhesive coating 8 to the article 9. The layer having optical properties 5 therefore remains in the region 15 in unison with the layers 6 to 8 on the article 9 to be secured.

In the region 16, the integrated system parts at the interface between the second release varnish layer 6 and the varnish layer 7—in other words, the adhesion of the release varnish layer 6 to the varnish layer 7 is lower than the adhesion of all other layers to one another and than the adhesion of the self-adhesive coating 8 to the article 9. The layer having optical properties 5 therefore remains in the region 16 in unison with the primer layer 10, the stamping/embossing varnish layer 2, the semitransparent metallic or HRI layer 3, and the release varnish layer 6 on the removed backing substrate 1.

In the region 17, the integrated system separates between the semitransparent metallic or HRI layer 3 and the release varnish layer 4—in other words, the adhesion between the layers 3 and 4 is lower than the adhesion of all other layers to one another and than the adhesion of the self-adhesive coating 8 to the article 9. The layer having optical properties 5 therefore remains in the region 17 in unison with the release varnish layer 4 and the layers 6 to 8 on the article 9 to be secured.

In the region 18, the integrated system separates between the layer having optical properties 5 and the release varnish layer 6—in other words, the adhesion between the layers 5 and 6 is lower than the adhesion of all other layers to one another and than the adhesion of the self-adhesive coating 8 to the article 9. The layer having optical properties 5 therefore remains in the region 18 in unison with the primer layer 10, the stamping/embossing varnish layer 2 and the semitransparent metallic or HRI layer 3 on the removed backing substrate 1.

The above adhesion relationships need not necessarily be combined in the manner shown in FIGS. 2 and 3, but instead may also occur in the combination of the situation of region 15 with region 18 or in the combination of the situation of region 17 with region 16. Depending on the design of the label of the invention, a particular combination of the adhesions arises; however, as a result of the unforeseeable way in which the tamper evidence feature is activated in detail, in other words how the backing substrate is removed, it may also be the case that all of the release situations shown for the regions 15 to 18 occur simultaneously on a single label.

It can clearly be seen that the self-adhesive coating 8 is always covered by further layers, but at least by the varnish layer 7, after the tamper evidence feature has been triggered. If, therefore, the part 14 of the label is grasped, it feels dry and not tacky. In detail it is now immaterial which of the layers 4 to 6 are still remaining additionally on the part 14, since all of these layers have the property of not being tacky in the sense of a self-adhesive coating.

If an attempt is then made to refasten the part 13 of the label to the part 14, it will be found that this is difficult to achieve, since the parts no longer adhere to one another. If an attempt is made to get around this by using an adhesive, it is very difficult to affix the part 13 to the part 14 in such a way that the complementary parts of the layer 5, located partly on the part 13 and partly on the part 14, come together in such a way as to give the impression of a continuous layer 5. In the event of any check, moreover, it would immediately be ascertained that the tamper evidence feature is no longer functioning in accordance with the invention if an attempt is made to remove the backing substrate again.

The fact that the part 14 of the label is no longer tacky may be a further advantage for the user if the article to be secured is used further after the tamper evidence feature has been triggered. An example that may be given here is that of use for demonstrating entry into and exit from a country in a passport. On entry, a label of this kind is first printed with the visa data and stuck into the passport. After the end of the period of residence, an official body triggers the tamper evidence feature, thereby officially confirming exit. For this purpose, for example, the release varnish layer 4 can be printed in the form of a text reading "exited". With this it is clearly evident that a period of residence has taken place within the country in question. When the passport is now closed again after the part 13 has been removed, the pages of the passport do not stick together, since the part 14 is no longer tacky.

FIG. 4 shows the security label 17 of the invention in a plan view, a customer-specific print 16 having been applied to its facing side, in the adhered state prior to tampering.

FIG. 5 shows the security label of the invention in a partially removed state—that is, with a partially activated tamper evidence feature. Remaining on the article to be secured is the part 14 of the label that has recesses in the layer having optical properties 5, in the form of negative signs 20 ("VOID"). The part of the layer having optical properties 5 that remains on the removed part of the label 13 is in the form of positive signs 21.

Example Construction 1

Printable Security Label

| Reference sign | Layer | Thickness/ application rate | Composition |
|---|---|---|---|
| 11 | Print primer | 1 g/m² | Polyester-based varnish system, crosslinking, solvent: methyl ethyl ketone |
| 1 | Backing substrate | 50 μm | PET |
| 10 | Primer | 0.5 g/m² | Acrylate-based varnish system crosslinked with isocyanates, solvent: ethyl acetate |
| 2 | UV varnish with hologram embossing | 3 g/m² | Acrylate-based varnish system with photoinitiator, undiluted |
| 3 | Semi-transparent metal layer | 0.5 OD (about 6.5 nm) | Aluminum, applied by vapor deposition |
| 4 | Release varnish, partial | 1 μm | Cycloolefin copolymer with 20% chlorinated polyolefins, solvent: xylene |
| 5 | Colored, pigmented varnish | 4 g/m² | PVC binder-based varnish with 15% red color pigments, solvent: ethyl acetate |
| 6 | Release varnish, full-area | 1 μm | Cycloolefin copolymer with 60% chlorinated polyolefins, solvent: xylene |
| 7 | Varnish layer | 7 g/m² | PVC binder-based transparent varnish, solvent: ethyl acetate |
| 8 | Self-adhesive coating | 10 g/m² | |

Example Construction 2

Security Label

| Reference sign | Layer | Thickness/ application rate | Composition |
|---|---|---|---|
| 1 | Backing substrate | 23 μm | PET, chemically pretreated on one side |
| 2 | UV varnish with hologram embossing | 3 g/m² | Acrylate-based varnish system with photoinitiator, undiluted |
| 3 | HRI coating | 50 nm | ZnS, applied by vapor deposition |
| 4 | Release varnish, partial | 0.2 μm | Silicone-based varnish, solvent: methyl ethyl ketone |
| 5 | Multicolored printing, partially alongside one another | 4 g/m² per color | PVC binder-based varnishes with 15% each of red, blue or white color pigments, solvent: ethyl acetate |
| 6 | Release varnish, full-area | 1 μm | Cycloolefin copolymer with 50% chlorinated polyolefins, solvent: xylene |
| 7 | Varnish layer | 7 g/m² | Acrylate binder-based transparent varnish, solvent: ethyl acetate |
| 8 | Self-adhesive coating | 10 g/m² | |

Example Construction 3

Adhesive Security Tape

| Reference sign | Layer | Thickness/ application rate | Composition |
|---|---|---|---|
| | Release varnish layer | 0.1 g/m² | Silicone coating |
| 1 | Backing substrate | 23 μm | PET |
| 10 | Primer | 0.5 g/m² | Acrylate-based varnish system crosslinked with isocyanates, solvent: ethyl acetate |
| 2 | Hot-stamping varnish | 3 g/m² | PMMA-based varnish system, solvent: ethyl acetate |
| 3 | Semitransparent metal layer | 0.5 OD (about 6.5 nm) | Aluminum, applied by vapor deposition |
| 4 | Release varnish, partial | 1 μm | PVC-based varnish with 2% adhesion additive (polyacrylate copolymer) in solvent: ethyl acetate |
| 5 | Colored varnish with color pigments and UV pigments | 3 g/m² | Nitrocellulose binder-based varnish with 10% yellow color pigments and 10% pigments exhibiting red fluorescence under UV light, solvent: ethyl acetate |
| 6 | Release varnish, full-area | 1 μm | PVC-based varnish with 4% adhesion additive (polyacrylate copolymer) in solvent: ethyl acetate |
| 7 | Varnish layer | 5 g/m² | Nitrocellulose binder-based transparent varnish, solvent: ethyl acetate |
| 8 | Self-adhesive coating | 15 g/m² | |

The invention claimed is:

1. A tamper-evident adhesive security tape or label comprising:
   a flexible backing substrate based on a flexible polymeric film, wherein one surface of the flexible backing substrate bears the following applied layers:
   a) an embossed varnish layer,
   b) a semitransparent metal layer and/or a high refractive index layer,
   c) a partial release varnish layer in a form of letters, signs, symbols, lines, guilloches, numbers or writing,
   d) one or more varnish layers having optical properties, e) a full-area release varnish layer,
f) a full-area varnish layer, and
g) a self-adhesive coating layer,
wherein, in regions that are not coated with the partial release varnish layer:
an adhesion of the embossed varnish layer, the semitransparent metal layer and/or the high refractive index layer, the one or more varnish layers having optical properties, the full-area release varnish layer, the full-area varnish layer, the self-adhesive coating layer, and an article to be secured to one another is greater than an adhesion of the one or more varnish layers having optical properties to the full-area release varnish layer, or the adhesion of the embossed varnish layer, the semitransparent metal layer and/or the high refractive index layer, the one or more varnish layers having optical properties, the full-area release varnish layer, the full-area varnish layer, the self-adhesive coating layer, and the article to be secured to one another is greater than an adhesion of the full-area release varnish layer to the full-area varnish layer;
and
wherein, in regions that are coated with the partial release varnish layer:
an adhesion of the embossed varnish layer, the semitransparent metal layer and/or the high refractive index layer, the partial release varnish layer, the one or more varnish layers having optical properties, the full-area release varnish layer, the full-area varnish layer, the self-adhesive coating layer, and the article to be secured to one another is greater than an adhesion of the semitransparent metal layer and/or the high refractive index layer to the partial release varnish layer, or the adhesion of the embossed varnish layer, the semitransparent metal layer and/or the high refractive index layer, the partial release varnish layer, the one or more varnish layers having optical properties, the full-area release varnish layer, the full-area varnish layer, the self-adhesive coating layer, and the article to be secured to one another is greater than an adhesion of the partial release varnish layer to the one or more varnish layers having optical properties; and
the adhesion of the semitransparent metal layer and/or the high refractive index layer to the partial release varnish layer is lower than the adhesion of the one or more varnish layers having optical properties to the full-area release varnish layer and the adhesion of the full-area release varnish layer to the full-area varnish layer, or the adhesion of the partial release varnish layer to the one or more varnish layers having optical properties is lower than the adhesion of the one or more varnish layers having optical properties to the full-area release varnish layer and the adhesion of the full-area release varnish layer to the full-area varnish layer.

2. The tamper-evident adhesive security tape or label of claim 1, wherein the flexible backing substrate consists of a transparent polymeric film.

3. The tamper-evident adhesive security tape or label of claim 1, wherein the one surface of the flexible backing substrate is a first surface, and a second surface of the flexible backing substrate bears a print primer layer.

4. The tamper-evident adhesive security tape or label of claim 3, wherein the tamper-evident adhesive security tape or label has printing on the print primer layer.

5. The tamper-evident adhesive security tape or label of claim 1, wherein the one surface of the flexible backing substrate is a first surface, and a second surface of the flexible backing substrate bears a release varnish layer.

6. The tamper-evident adhesive security tape or label of claim 1, wherein an adhesion promoter layer is disposed situated between the flexible backing substrate and the embossed varnish layer.

7. The tamper-evident adhesive security tape or label of claim 1, wherein a release layer is disposed between the flexible backing substrate and the embossed varnish layer.

8. The tamper-evident adhesive security tape or label of claim 1, wherein the one or more varnish layers having optical properties is formed by multicolor printing, as a color gradation layer and/or as a layer comprising effect pigments and/or security dyes or pigments.

9. The tamper-evident adhesive security tape or label of claim 1, wherein the letters, signs, symbols, lines, guilloches, numbers or writing become recognizable and are positive on the article to be secured and negative on the removed backing substrate, or vice-versa after triggering of a tamper evidence feature.

10. The tamper-evident adhesive security tape or label of claim 1, wherein the semitransparent metal layer and/or the high refractive index layer is a semitransparent metal layer comprising Al, Cu, Fe, Ag, Au, Cl, Ni, Zn, Sn, Pt, Ti, Pd, or an alloy of these metals.

11. The tamper-evident adhesive security tape or label of claim 1, wherein the semitransparent metal layer and/or the high refractive index layer is an HRI layer comprising a metal compound.

12. The tamper-evident adhesive security tape or label of claim 1, wherein the semitransparent metal layer and/or the high refractive index layer is an HRI varnish layer.

13. The tamper-evident adhesive security tape or label of claim 1, wherein the embossed varnish layer is an embossed UV varnish layer.

14. The tamper-evident adhesive security tape or label of claim 1, wherein the embossed varnish layer is a hot-stamping varnish layer.

15. The tamper-evident adhesive security tape or label of claim 1, wherein the partial release varnish layer and the full-area release varnish layer consist of the same components in different proportions.

16. The tamper-evident adhesive security tape or label of claim 1, wherein the partial release varnish layer and the full-area release varnish layer consist of varnishes having different compositions.

17. The tamper-evident adhesive security tape or label of claim 1, wherein the one surface of the flexible backing substrate is a first surface, and the adhesive security tape or label has printing on a second surface of the backing substrate.

18. The tamper-evident adhesive security tape or label of claim 1, wherein the embossed varnish layer has embossing in form of a hologram, a diffractive structure or a diffraction grating.

19. The tamper-evident adhesive security tape or label of claim 16, wherein the tamper-evident adhesive security tape or label imparts a visual impression of the hologram with a colored background and possesses no metallically reflecting character.

20. The tamper-evident adhesive security tape or label of claim 1, wherein the one surface of the flexible backing substrate is a first surface, and a second surface of the backing substrate is uncoated, the first surface being opposite to the second surface.

* * * * *